UNITED STATES PATENT OFFICE.

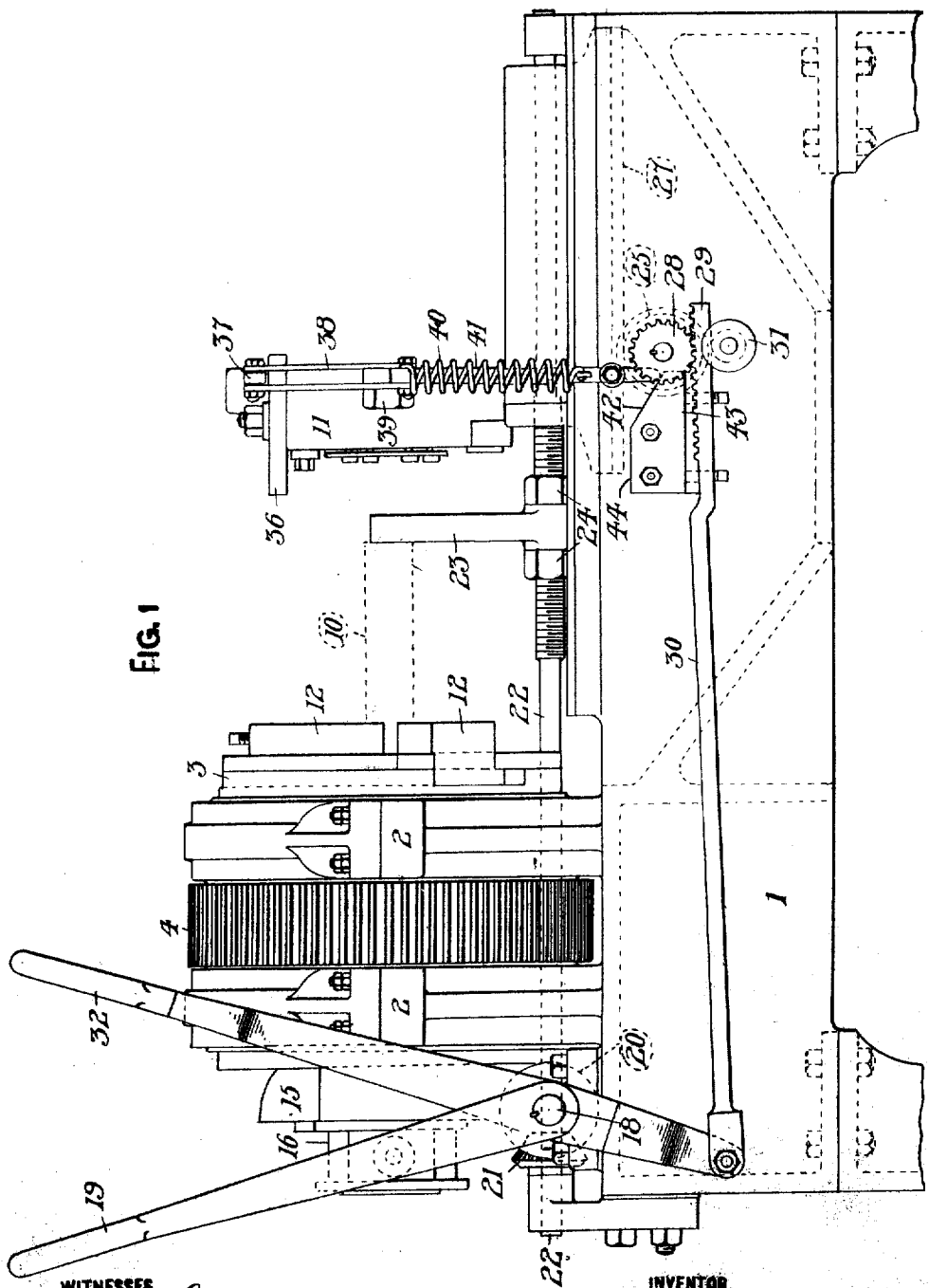

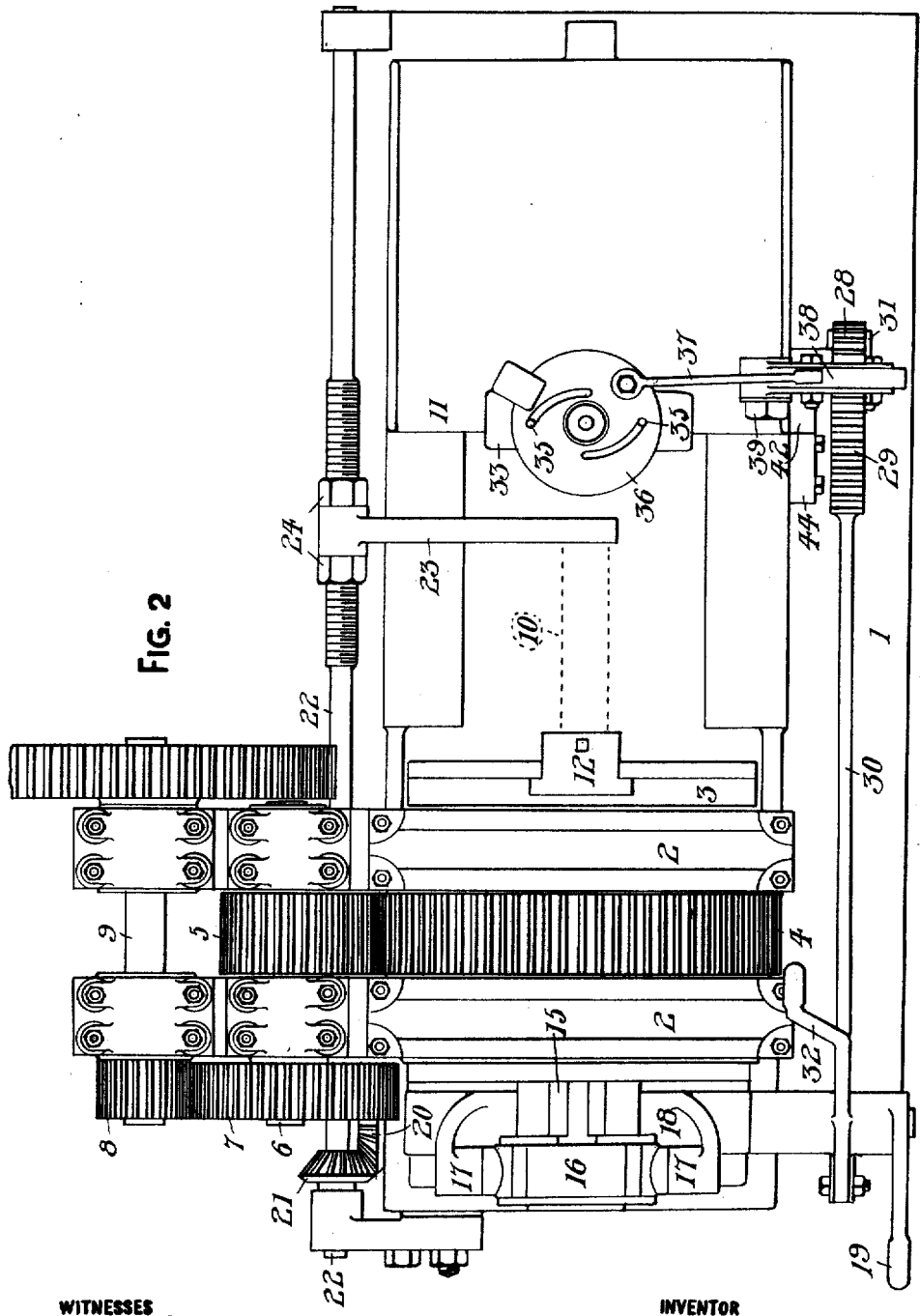

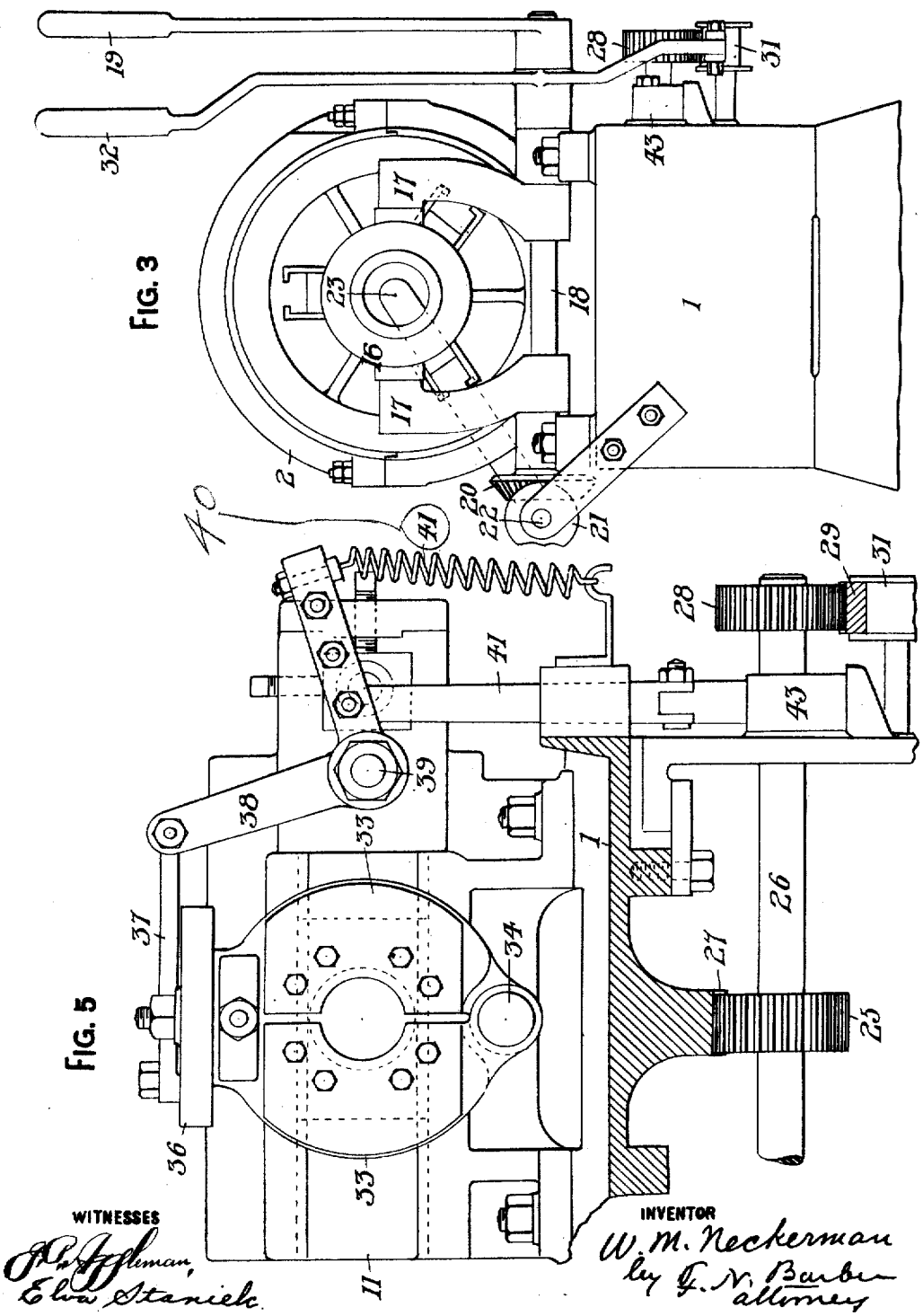

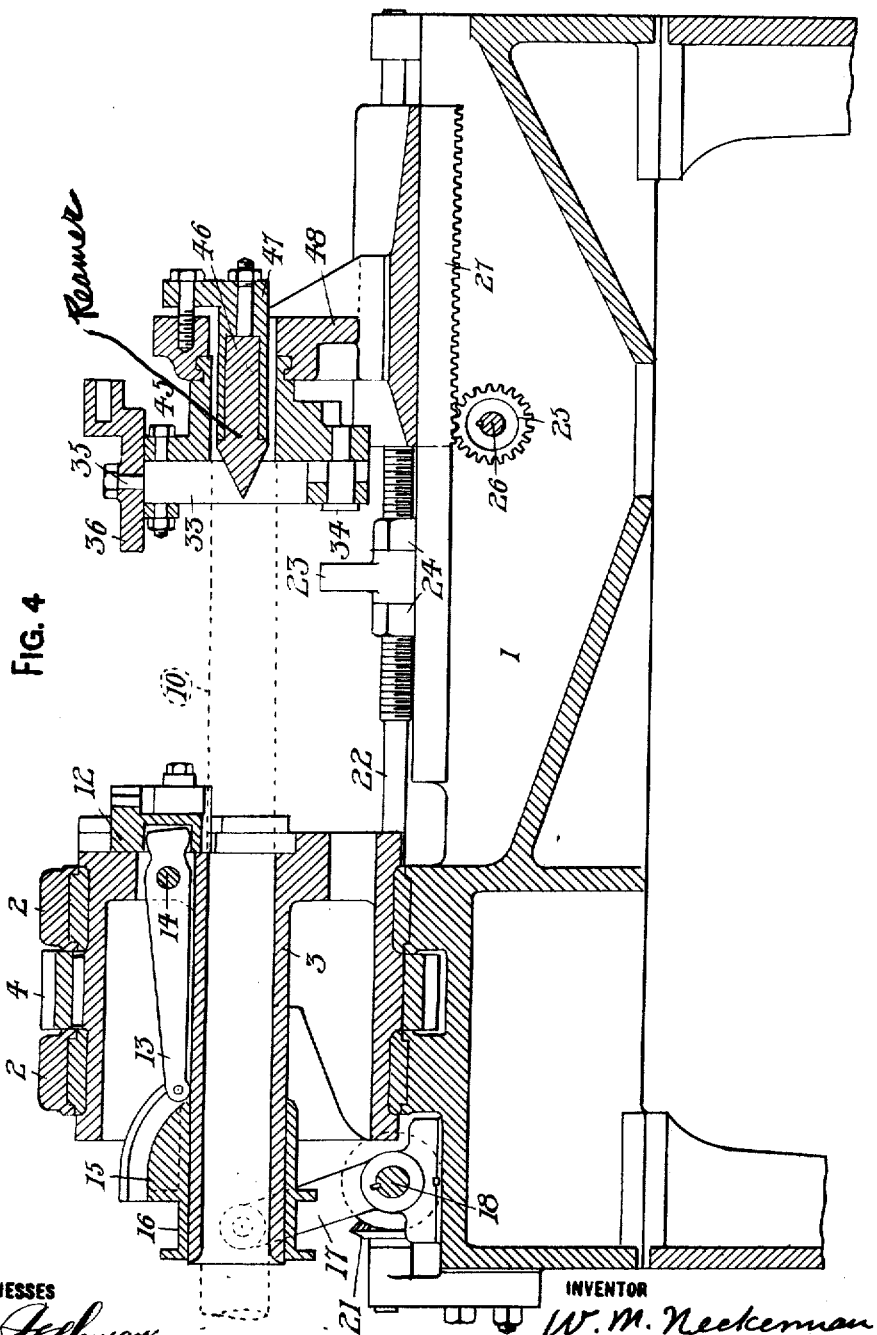

WILLIAM M. NECKERMAN, OF YOUNGSTOWN, OHIO.

PIPE-THREADING MACHINE.

1,013,212. Specification of Letters Patent. Patented Jan. 2, 1912.

Application filed January 12, 1911. Serial No. 602,321.

*To all whom it may concern:*

Be it known that I, WILLIAM M. NECKERMAN, a citizen of the United States, residing at Youngstown, in the county of Mahoning and State of Ohio, have invented new and useful Improvements in Pipe-Threading Machines, of which the following is a specification.

My invention relates to machines for threading the ends of pipe.

The objects thereof are to provide means for stopping the pipe at a definite place before clamping it in the pipe-gripping head, and for moving the die-head to the end of the pipe without the attendant changing the position in which he is when actuating jaws on the said pipe-gripping head.

Other objects will appear hereinafter.

Referring to the accompanying drawings, Figure 1 is a side elevation of a pipe-threading machine embodying my improvements; Fig. 2, a plan thereof; Fig. 3, an end elevation looking toward the right, Fig. 1; Fig. 4, a vertical longitudinal section; and Fig. 5, a cross-section between the chuck and the die-head.

On the drawings, 1 represents the bed of the machine, having thereon the two housings or bearings 2, in which the ends of the hollow spindle, gripping-head or chuck-head 3 rotate axially. The spindle 3 has the external cog-teeth 4 meshing with pinion 5 on the shaft 6. A spur-gear 7 on the shaft 6 meshes with the pinion 8 on the shaft 9 driven in any desired manner. The spindle 3 is hollow so that the pipe 10 to be threaded may extend through the same and project toward the die-head 11, also mounted on the bed 1.

The pipe 10 may be gripped by various well-known means associated with the spindle so as to cause the pipe to rotate therewith. I have shown a well-known chuck for this purpose and it may be briefly described as follows. The spindle 3 is provided with radially movable gripping jaws 12 arranged to be projected into the axial hollow in the spindle and to grip the exterior of the pipe to be threaded. The jaws 12 are forced radially by the first class levers 13 (only one shown) Fig. 4. Each lever 13 is pivoted on a pin 14 and has its short arm in a socket in a jaw 12 while its long arm is arranged to be moved back and forth on the pivot 14 by the cone 15 slidable in the spindle 3. The cone 15 has an extension provided with the circumferential groove 16, with which the yoke 17 coöperates to move the cone back and forth. The yoke is carried by the rock-shaft 18, which is operated by the lever 19. The shaft 18 has at one end the bevel gear 20 which meshes with the bevel gear 21 on the rock-shaft 22 which is parallel with the pipe 10. The shaft 22 carries the stop-arm 23 which may be adjustably clamped thereon by the nuts 24. The arm 22 is of such length that its end may in one position form a stop for the end of the pipe 10 as shown on Figs. 1, 2, and 3.

The die-head 11 has travel on the bed 1 toward and from the chuck head 3, this travel being caused by the rotation of the pinion 25 which is keyed to the shaft 26 and is in mesh with the rack 27 on the under side of the die-head. The shaft 26 extends beyond one side of the bed 1, where it carries the pinion 28 which meshes with the rack 29 on the upper side of the link or bar 30 riding on the roller 31. The link 30 is reciprocated by the lever 32 which is loosely mounted on the shaft 18.

The die-head 11 carries a pair of die-carrying jaws 33 pivoted at their lower ends on the pivot 34, the upper ends thereof having the pins 35 in the curved slots in the vertical oscillatory plate 36. The plate 36 is rocked by the horizontal link 37 pivoted to the plate and the upper arm of the bell-crank lever 38 pivoted at 39 on the head 11. The other arm of the bell-crank lever 38 is urged downwardly by the spring 40 and is pivotally connected to the vertically slidable bar 41 having its lower end arranged to ride up on the inclined path 42 on the block 43 removably secured to the bed 1. The length of the incline 42 is such as to cause the jaws 33 to close ready for forming a thread in the pipe 10 before the jaws 33 engage the end of the pipe. The block 43 has a horizontal portion 44 at the top of the incline 42 on which portion 44 the end of the bar rides while the threading dies are working on the pipe. The length of the portion 44 is such that the bar 41 will reach the end thereof just when the desired length of the pipe has been threaded. Just as soon as the bar 41 passes the block 43, the spring 40 causes the die-holding jaws 33 to open, whereupon the die-head 11 may be quickly returned to its idle position by the operation of the lever 32, the lower end of the finger being pivoted so as to swing above the block 43 on its engagement therewith when the head 11 is returning or backing-off.

In Fig. 4, I have shown a reamer secured in the head 11 so as to ream out the end of the pipe as the head moves during the threading operation. The reamer head 45 has its shank 46 seated in the holder 47 which is bolted to the back of the carriage 48 on which the die head 11 is mounted.

The operation of the described threading machine is as follows: The pipe 10 is pushed from the left through the spindle or chuck 3 until its forward end engages the stop 23, which has previously been rocked into the path of the pipe by actuation of the lever 19. The lever 19 is then pulled toward the die-head 11, causing, first, the arm 23 to be swung out of the path of the said die-head and then the pipe 10 to be gripped in the head or chuck 3, which is then made to rotate, if it is not already rotating. The lever 32 is then pulled to the left which causes the die-head to move toward the pipe 10 and the jaws 33 to close as hereinbefore explained. As soon as the dies begin cutting the thread on the pipe, the pull on the lever 32 may be stopped, since the threads will feed the die-head until the bar 41 drops off from the block 43 as before explained. The lever 32 backs off the die-head 11 and the lever 19 causes the pipe to be released and the arm 23 to be returned so as to act as a stop for the next pipe to be threaded. The stop 23 and the block 43 are so arranged that desired length of the pipe will be threaded.

Heretofore the shaft 26 has been operated by a hand-wheel thereon necessitating that the attendant shall, after he has actuated the lever 19 to grip the pipe, walk several feet to actuate the shaft 26. By my improvements I save the time required by the attendant in walking back and forth between the lever 19 and the shaft 26 for each pipe that is threaded and I provide a stop which accurately locates the pipe for uniform threading. The operating ends of the levers 19 and 32 are placed close together and at the feeding-in end of the gripping head 3; that is, close to the left hand end of the gripping-head, so that the attendant who needs to be at this place when the pipes are fed into the machine will also be where he can operate the levers 19 and 32 with practically no change of position.

I claim—

1. In a pipe threading machine, a head having an axial opening therein, gripping-jaws on the head arranged to connect the pipe to the head, means for actuating the jaws, a die-head, a stop arranged to be moved into the path of the pipe when moving through the gripping head toward the die-head, and means connecting the stop to the jaw actuating means so that the stop will be moved out of line with the pipe when the jaws grip the pipe.

2. In a pipe-threading machine, a pipe-gripping head having an axial opening for the pipe, pipe-gripping jaws on the said head, a die-head in line with the said axial opening, a rotary shaft, connections between the die-head and the shaft to cause the die-head to move toward the gripping-head on the rotation of the shaft in one direction, a driving pinion on the shaft, a reciprocating bar having thereon a rack in mesh with the pinion, and two levers having their operating ends near together at the feeding-in end of the gripping head within the reach of an attendant without requiring his change of position, connections from one lever to operate the pipe-gripping jaws, and a connection from the other lever to the said bar.

3. In a head having an opening therein for pipe, pipe-gripping jaws in the head, a rock-shaft and connections for actuating the gripping jaws, a die-head in line with the said opening, a stop arranged to be moved into the path of pipe when moved through the opening toward the die-head, and means connecting the stop to the rock-shaft so that the stop is moved away from the end of the pipe as the jaws move toward the pipe.

Signed at Youngstown, Ohio, this 3rd day of January, A. D. 1911.

WILLIAM M. NECKERMAN.

Witnesses:
FRANK J. MCCARTY,
J. J. CONNOR.

---

Copies of this patent may be obtained for five cents each, by addressing the "Commissioner of Patents, Washington, D. C."